US008259777B2

(12) United States Patent
Li et al.

(10) Patent No.: US 8,259,777 B2
(45) Date of Patent: Sep. 4, 2012

(54) SYSTEMS AND METHODS FOR RAPID UPLINK AIR INTERFACE SYNCHRONIZATION

(75) Inventors: Xuan Li, Shanghai (CN); Manyuan Shen, Sunnyvale, CA (US); Guanbin Xing, Issaquah, WA (US)

(73) Assignee: Adaptix, Inc., Seattle, WA (US)

( * ) Notice: Subject to any disclaimer, the term of this patent is extended or adjusted under 35 U.S.C. 154(b) by 1331 days.

(21) Appl. No.: 11/651,239

(22) Filed: Jan. 9, 2007

(65) Prior Publication Data

US 2008/0130766 A1 Jun. 5, 2008

(30) Foreign Application Priority Data

Nov. 30, 2006 (CN) .......................... 2006 1 0160842

(51) Int. Cl.
*H04B 1/00* (2006.01)
(52) U.S. Cl. ........ 375/142; 375/150; 370/516; 370/519; 455/522
(58) Field of Classification Search .................. 375/130, 375/142, 140, 371, 150; 370/516, 519, 480; 455/522
See application file for complete search history.

(56) References Cited

U.S. PATENT DOCUMENTS

| 6,198,765 | B1 * | 3/2001 | Cahn et al. ..................... 375/142 |
| 6,212,368 | B1 * | 4/2001 | Ramesh et al. ............. 455/277.2 |
| 6,237,013 | B1 * | 5/2001 | Usui ............................. 708/422 |
| 6,363,049 | B1 * | 3/2002 | Chung .......................... 370/210 |
| 6,937,583 | B1 * | 8/2005 | Czaja et al. .................... 370/331 |
| 7,062,002 | B1 * | 6/2006 | Michel et al. .................. 375/354 |
| 7,259,717 | B2 * | 8/2007 | Gounon .................... 342/357.08 |
| 7,359,366 | B2 * | 4/2008 | Lee et al. ....................... 370/344 |
| 7,486,736 | B2 * | 2/2009 | Zhidkov ........................ 375/260 |
| 7,561,628 | B2 * | 7/2009 | Sung et al. ..................... 375/260 |
| 7,564,909 | B2 * | 7/2009 | Sung et al. ..................... 375/260 |
| 7,729,329 | B2 * | 6/2010 | Fujita et al. .................... 370/342 |
| 2001/0055320 | A1 | 12/2001 | Pierzga et al. |
| 2002/0172223 | A1 * | 11/2002 | Stilp ............................. 370/480 |
| 2003/0043768 | A1 * | 3/2003 | Chang et al. .................. 370/335 |
| 2003/0165184 | A1 * | 9/2003 | Welborn et al. ............... 375/146 |
| 2003/0185166 | A1 * | 10/2003 | Belcea .......................... 370/321 |
| 2005/0195791 | A1 * | 9/2005 | Sung et al. ..................... 370/342 |
| 2005/0220002 | A1 | 10/2005 | Li et al. |

(Continued)

FOREIGN PATENT DOCUMENTS

JP 2002044049 A * 2/2002

OTHER PUBLICATIONS

Machine Translation of document JP-2002044049, Mar. 7, 2011.*

(Continued)

*Primary Examiner* — Jean B Corrielus
(74) *Attorney, Agent, or Firm* — Martin & Ferraro, LLP

(57) ABSTRACT

Rapid uplink synchronization is enabled by reducing a 2D search problem to two 1D search problems, which can generally be performed in less time. Advantage is taken of fact that a mobile device sends a ranging code on multiple sub-carriers. Using the assumption that adjacent sub-carriers will have approximately equivalent channel characteristics, phase ambiguity can be removed by differentially combining pairs of adjacent sub-carriers. Once the phase ambiguity is removed, the code, timing, and power level may be determined relatively quickly. In one embodiment, the values of correlations between received signals and possible codes are compared with a threshold.

20 Claims, 2 Drawing Sheets

U.S. PATENT DOCUMENTS

2006/0072629 A1     4/2006  Kent et al.
2006/0114816 A1     6/2006  Maltsev et al.
2006/0121922 A1 *   6/2006  Krasner ........................ 455/517
2006/0222056 A1 *  10/2006  Yotsumoto et al. ........... 375/149
2008/0240047 A1 *  10/2008  Ozluturk et al. .............. 370/335

OTHER PUBLICATIONS

International Search Report and Written Opinion issued for PCT/US2007/085697; Dated May 1, 2008; 9 Pages.

* cited by examiner

SYSTEMS AND METHODS FOR RAPID UPLINK AIR INTERFACE SYNCHRONIZATION

RELATED APPLICATIONS

This application is related to and claims priority to Chinese Application No. 200610160842.9 filed Nov. 30, 2006 entitled "SYSTEMS AND METHODS FOR RAPID UPLINK AIR INTERFACE SYNCHRONIZATION", the disclosure of which is hereby incorporated herein by reference.

TECHNICAL FIELD

This invention relates to air interface communication systems synchronization between base stations and mobile devices and more particularly to rapid uplink synchronization based on signals sent from the mobile devices.

BACKGROUND OF INVENTION

In wireless (air interface) communication systems, signals transferred from a plurality of mobile devices arrive at the base station with different propagation delays and different power. Large propagation delay and power difference often result in significant loss of signal at the base station. One method for the base station to control the propagation delays and power levels of the signal from mobile devices is to have each mobile device send a predetermined pseudo random code identifying itself on a defined ranging time slot or channel. These codes, or ranging signals are used by the base station (which could include any suitable distant end transmission point) to determine the time delay and transmission power level of the mobile device.

Since the base station does not know which code is being sent by the mobile device, the base station must isolate the sub-channel codes for each mobile device. One method of isolating the code from a mobile device is to match the incoming signal against a known signal in order to determine which code is being sent. However, because there are many possible codes and because they are not arriving at the base station with a known time (phase), the solution to the problem becomes a two-dimensional calculation, i.e., first the system must check to see if the signal contains a known code at a first time (first phase). If not, then the system must repeat the process for successive time slices (phases) to see if a particular code is being received. This is time consuming and requires high processor resources. Besides, the channel phase ambiguities acting on ranging channel will significantly deteriorate the measurement precise of propagation delays.

BRIEF SUMMARY OF THE INVENTION

A two-dimensional (2D) search problem is reduced to two one-dimensional (1D) search problems, which can generally be performed in less time. Advantage is taken of fact that each mobile device sends the randomly selected ranging code on multiple sub-channels. In Orthogonal Frequency Division Multiple Access (OFDMA) and Orthogonal Frequency Division Multiplexing (OFDM) systems, the ranging channel is often composed of a group of adjacent sub-carriers. An assumption can then be made that adjacent sub-carriers (because they are close in frequency and other characteristics) will have approximately (although not necessarily) same channel characteristics. By differentially multiplying pairs of adjacent received ranging sub-carriers, the channel phase ambiguity can be removed between those sub-carriers. Power levels for each ranging code can be calculated by correlating the differential received ranging sub-carriers with local predetermined differential ranging codes. All the ranging codes with power meeting a predetermined threshold are selected as the ranging codes transmitted from the mobile devices. Time delay measurement is then performed only for the selected ranging codes. Since in most cases the selected ranging codes belong to a subset of the total ranging codes, the computing complexity may be reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
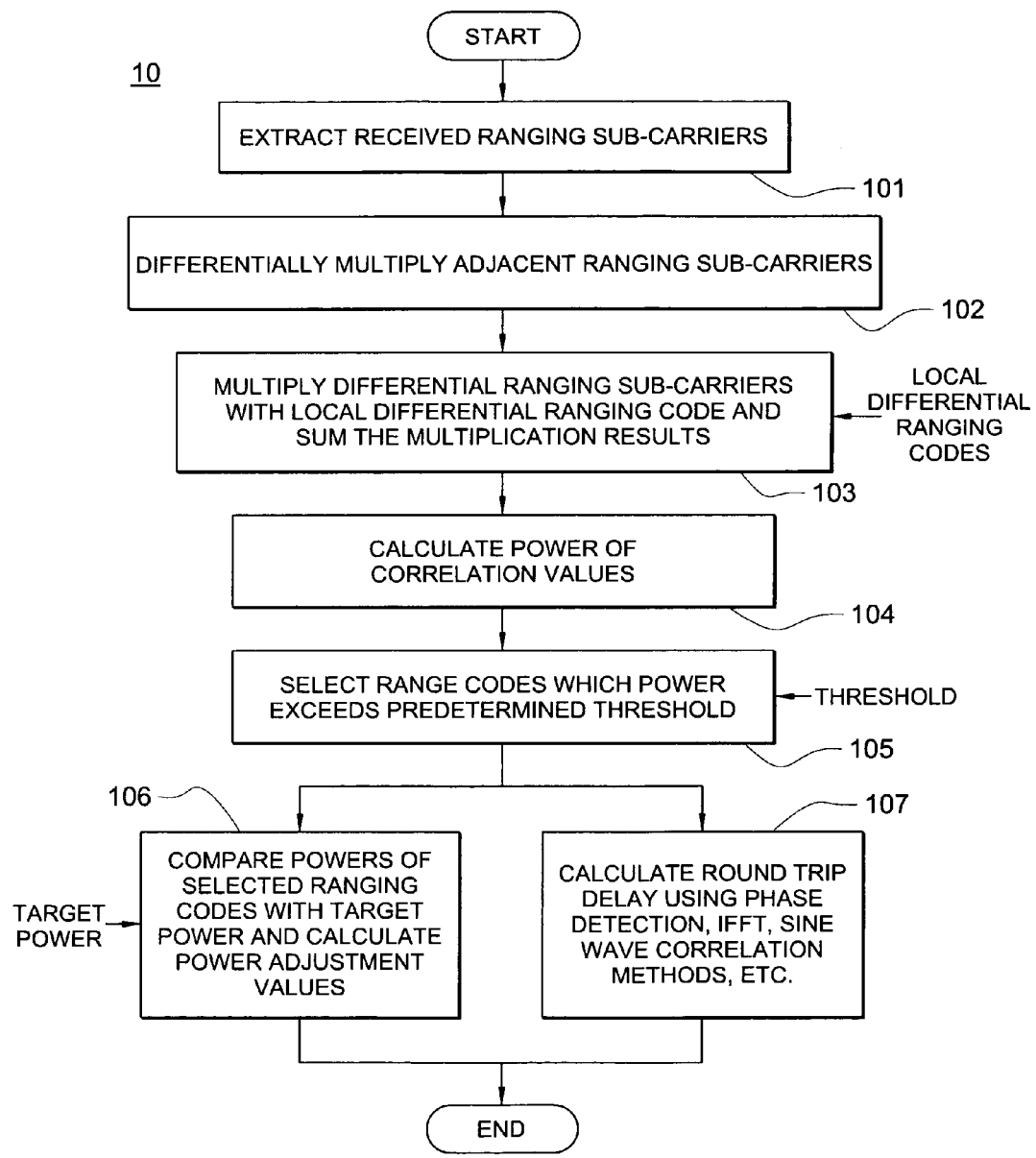
FIG. 1 illustrates one embodiment of a flow chart for obtaining uplink synchronization for air interface communication between a base station and a mobile device.
Figure 2:
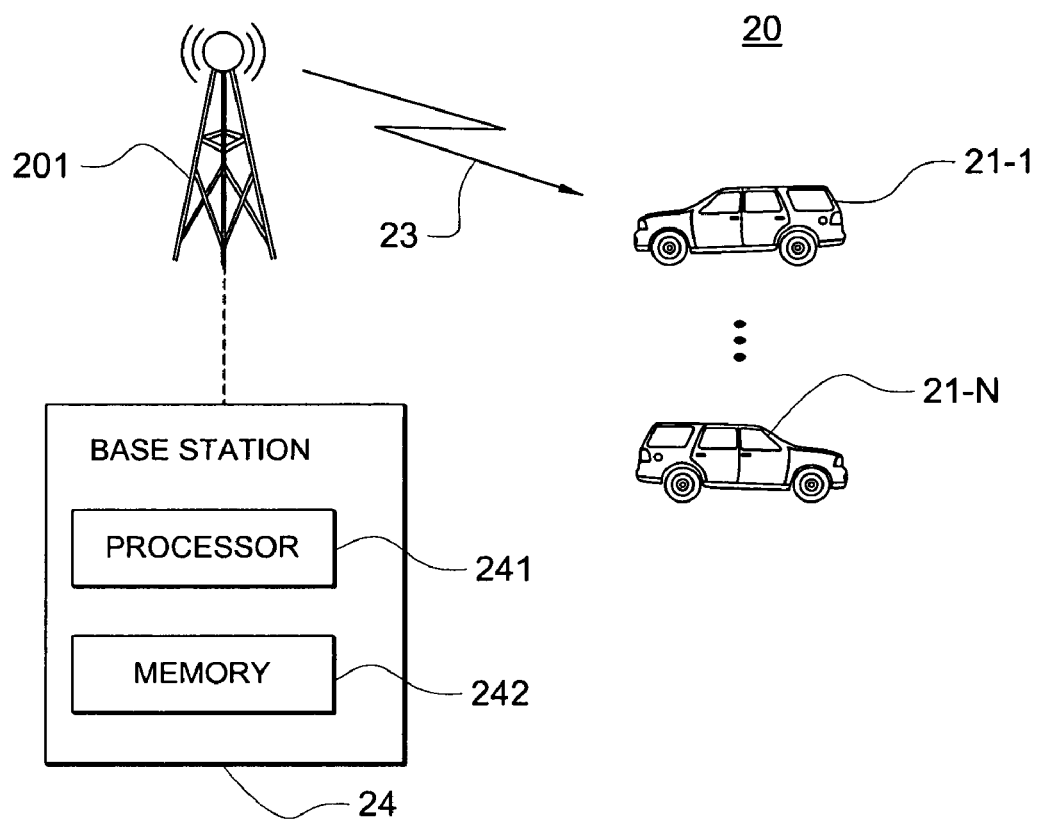
FIG. 2 shows a typical air interface system in which the concepts of the invention can be practiced.

FIG. 1 illustrates one embodiment of flow chart 10 for obtaining uplink synchronization for air interface communication (23 FIG. 2) between a base station, such as transmission point 201, shown in FIG. 2, and a mobile device, such as device 21-1 shown in FIG. 2. The algorithm shown in FIG. 1 can be run, for example, by processor 241 in conjunction with memory 242 operating in base station 24 which can be co-located with the actual point of transmission, or can be remote there from.

Process 101 extracts the ranging sub-carriers from the signal received from the mobile device from time to time. In effect, the ranging sub-carriers are separated from the other data, such as the payload data, etc. Each ranging channel is composed of multiple sub-carriers. For example, in an OFDMA system 144 ranging sub-carriers may be specified. The concepts discussed herein are particularly well-suited for OFDMA as well as OFDM systems. A mobile device selects a pseudo-random code and transmits that code on all of the ranging sub-carriers. The pseudo-random code identifies the mobile device, and the base station then determines, as will be discussed below, the average power level of each received random code in order to determine whether the mobile device which transmitted that code should adjust its transmission power.

Process 102 then differentially multiplies the adjacent ranging sub-carriers. An approximation may be made that channels of adjacent sub-carriers are coherent, in the sense that phase characteristics will be approximately same between adjacent sub-carriers. This approximation is useful if sub-carrier spacing is smaller than the channel coherent bandwidth. Channel phase rotation on each sub-carrier may then be removed by multiplying a specific sub-carrier with the conjugation of an adjacent sub-carrier.

Process 103 multiplies differential ranging sub-carriers with local replicas of the possible differential ranging codes, which may be pre-calculated and stored in memory 242 shown in FIG. 2, and then sums the multiplication results. This produces a correlation between the possible ranging codes and the ranging code transmitted by the mobile device. The correlation value of the ranging code transmitted by the mobile device will be highest value. In this manner, the correlation values can be used by base station 24, as will be discussed below, to isolate ranging codes for each mobile device.

Process 104 calculates the power of the correlation values for the convenience of threshold comparison in a following process. Process 105 determines which ranging codes are transmitted by mobile devices. All of the ranging codes with power exceeding the predetermined threshold will be selected as the transmitted ranging codes. If no acceptable power level is found, the mobile device can be told to increase its power and transmit another ranging code in subsequence time frame.

At this point, the code has been identified for certain mobile device. Process 106 compares the power levels of the selected ranging codes with target power levels and thus determines the power adjustment value for that mobile device in subsequent transmissions. Process 107 calculates time delay using several methods, such as, for example, phase detection, inverse FFT or sine wave correlation. This time delay corresponds to the round trip delay between base station and mobile device, and the mobile device can use this value to adjust its transmission time in subsequent frames.

Transmitted ranging codes may be shown as:

$$X_t(k,l) \in \{-1,1\}$$

where k is ranging sub-carrier index (k=1, ..., K) and l is ranging sequence index (l=1, ..., L).

Received ranging codes in frequency domain is:

$$X_r(k, l) = X_t(k, l) \cdot H(k, l) \cdot e^{-j\frac{2\pi k \tau(l)}{N}}$$

where H(k,l) is the complex channel transfer function of the k-th sub-carrier of the l-th transmitted ranging sequence, τ(l) is propagation delay corresponding to the l-th ranging sequence and N is the sub-carrier number.

$$R(l, l') = \sum_k [X_r(k+1, l) \cdot X_r^*(k, l) \cdot X_t(k+1, l') \cdot X_t^*(k, l')]$$

$$l' = 1, 2, \ldots, L$$

Differentially multiplying adjacent ranging codes gives:

$$X_r(k+1,l) \cdot X_r^*(k,l) = X_t(k+1,l) \cdot X_t^*(k,l) \cdot H(k+1,l) \cdot H^*(k,l) \cdot e^{-j\frac{2\pi k \tau(l)}{N}}$$

Assuming adjacent channels are coherent, we have:

$$X_r(k+1,l) \cdot X_r^*(k,l) = X_t(k+1,l) \cdot X_t^*(k,l) \cdot |H(k,l)|^2 \cdot e^{-j\frac{2\pi k \tau(l)}{N}}$$

Multiplying received differential ranging codes with local differential ranging codes and summing the results yields:

$$R(l, l') = \sum_k [X_r(k+1, l) \cdot X_r^*(k, l) \cdot X_t(k+1, l') \cdot X_t^*(k, l')] \quad l' = 1, 2, \ldots, L$$

Power is then:

$$P(l,l') = |R(l,l')|^2$$

Maximum P(l,l') can be obtained when l'=l, i.e.:

$$P_{max}(l, l') = |R(l, l')_{l=l'}|^2$$
$$= |R(l)|^2$$
$$= \left|e^{-j\frac{2\pi \tau(l)}{N}} \sum_k |H(k, l)|^2\right|$$
$$= \left|\sum_k |H(k, l)|^2\right|^2$$

Therefore, selection of ranging codes sequences with power P exceeding the predetermined threshold $P_{th}$ may be shown as:

$$L_s = \{l' : P(l,l') > P_{th}\}$$

One way to calculate the transmit time is the Inverse Fast Fourier Transform (IFFT) method. The channel impulse response of a ranging channel is calculated by:

$$h(l, t-\tau) = \underset{k}{IFFT}(X_r(k, l) \cdot X_t(k, l))$$
$$= \underset{k}{IFFT}(H(k, l) \cdot e^{-j\frac{2\pi k \tau(l)}{N}})$$

$$l \in L_s$$

Transmit time delay τ may be obtained based on the first path of the channel impulse response. However, this method requires an IFFT operation, which may be time consuming and resource intensive. Another way to estimate the transmit time delay is the phase detection method, which calculates phase rotation θ of a differential correlation value and obtains transmit time delay τ from:

$$\theta(l) = \arg(R(l)) = -\frac{2\pi \tau(l)}{N}$$

$$l \in L_s$$

-continued $$\tau(l) = -\frac{\theta(l)N}{2\pi}$$

$l \in L_s$

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of establishing an air interface communication between a base station and a mobile device, said method comprising:
    removing phase ambiguity from ranging signals transmitted by said mobile device and received at said base station, said removing producing differential ranging sub-carriers; and
    after said phase ambiguity has been removed, correlating said ranging signals with possible ranging codes, wherein said correlating comprises:
    multiplying said differential ranging sub-carriers with one or more local replicas of possible differential ranging codes;
    summing the results of said multiplying, said summing producing one or more correlation values between said local replicas and said ranging signals transmitted by said mobile device;
    calculating power levels of said one or more correlation values;
    selecting a set of correlation values from said one or more correlation values, wherein each of said selected set of correlation values have a power level that exceeds a predetermined threshold;
    calculating a power adjustment value for said mobile device by comparing said power levels of said selected set of correlation values with a target power; and
    providing to said mobile device information based on said power adjustment value.

2. The method of claim 1 further comprising:
    after said correlating said ranging signals with said possible ranging codes, calculating a propagation time of said air interface communication between said mobile device and said base station.

3. The method of claim 2 wherein said calculating said propagation time comprises: phase detection.

4. The method of claim 2 wherein said calculating said propagation time comprises a method selected from the list including:
    inverse Fast Fourier Transform (FFT) and sine wave correlation.

5. The method of claim 1 wherein said removing phase ambiguity comprises:
    differentially multiplying adjacent ranging sub-carriers.

6. The method of claim 1 further comprising:
    after said correlating said ranging signals with said possible ranging codes, instructing said mobile device to increase transmission power of said mobile device if none of said power levels exceed said predetermined threshold.

7. The method of claim 1 for use in an orthogonal frequency division multiple access (OFDMA) system.

8. The method of claim 1 for use in an orthogonal frequency division multiplexing (OFDM) system.

9. The method of claim 1, further comprising:
    calculating an identifying code from said ranging signals; wherein said calculating includes calculating a highest correlation value of said correlation values and, if said highest correlation value exists, identifying a member of said local replica of possible ranging codes corresponding to said highest correlation value.

10. The method of claim 9, further comprising:
    instructing said mobile device to increase transmission power if no ranging signal is identified from said identifying.

11. An air interface communication system comprising:
    a base station including at least one processor, said at least one processor adapted for removing phase ambiguity from ranging signals transmitted by a mobile device, said removing producing differential ranging sub-carriers, and,
    after said phase ambiguity has been removed, correlating said ranging signals with possible ranging codes, wherein said correlating comprises:
    multiplying said differential ranging sub-carriers with one or more local replicas of possible differential ranging codes;
    summing the results of said multiplying, said summing producing one or more correlation values between said local replicas and said ranging signals transmitted by said mobile device;
    calculating power levels of said one or more correlation values;
    selecting a set of correlation values from said one or more correlation values, wherein each of said selected set of correlation values has a power level that exceeds a predetermined threshold; and
    calculating a power adjustment value for said mobile device by comparing said power levels of said selected set of correlation values with a target power.

12. The system of claim 11 wherein said at least one processor is further adapted for:
    after said correlating said ranging signals with said possible ranging codes, calculating a propagation time of air interface communication between said mobile device and said base station.

13. The system of claim 12 wherein said calculating said propagation time uses phase detection.

14. The system of claim 12 wherein said calculating said propagation time uses one of: inverse Fast Fourier Transform (FFT) and sine wave correlation.

15. The system of claim 11 wherein said removing phase ambiguity includes differentially multiplying adjacent ranging sub-carriers.

16. The system of claim 11 further comprising:
    after said correlating said ranging signals with said possible ranging codes, instructing said mobile device to increase transmission power of said mobile device if said power level does not exceed said predetermined threshold.

17. The system of claim 11 wherein said air interface communication system is an orthogonal frequency division multiple access (OFDMA) system.

18. The system of claim 11 wherein said air interface communication system is an orthogonal frequency division multiplexing (OFDM) system.

19. A method comprising:
   extracting received ranging sub-carriers from a signal transmitted by a mobile device;
   differentially multiplying adjacent ranging sub-carriers of said received ranging sub-carriers;
   multiplying said result of said differentially multiplying with one or more local replicas of possible differential ranging codes;
   summing the results of said multiplying, said summing resulting in one or more correlation values between said local ranging codes and said received ranging sub-carriers;
   selecting a range of transmitted ranging codes from said received ranging sub-carriers, wherein each ranging code of said selected range of said transmitted ranging codes has a power exceeding predetermined threshold, said power being calculated from said one or more correlation values corresponding to said received ranging sub-carriers;
   comparing each of said power of each of said selected range of said transmitted ranging codes with a target power;
   calculating power adjustment values for said mobile device based on said comparing; and
   providing to said mobile device information based on said power adjustment values.

20. A base station comprising:
   at least one processor configured for:
      extracting received ranging sub-carriers from a signal transmitted by a mobile device;
      differentially multiplying adjacent ranging sub-carriers of said received ranging sub-carriers;
      multiplying said result of said differentially multiplying with one or more local replicas of possible differential ranging codes stored in memory;
      summing the results of said further multiplying, said summing resulting in one or more correlation values;
      selecting a range of transmitted ranging codes from said received ranging sub-carriers, wherein each ranging code of said selected range of said transmitted ranging codes has a power exceeding predetermined threshold, said power being calculated from said one or more correlation values corresponding to said received ranging sub-carriers;
      comparing each of said power of each of said selected range of said transmitted ranging codes with a target power; and
      calculating power adjustment values for said mobile device based on said comparing.

* * * * *

UNITED STATES PATENT AND TRADEMARK OFFICE
CERTIFICATE OF CORRECTION

PATENT NO.       : 8,259,777 B2                          Page 1 of 1
APPLICATION NO.  : 11/651239
DATED            : September 4, 2012
INVENTOR(S)      : Xuan Li et al.

It is certified that error appears in the above-identified patent and that said Letters Patent is hereby corrected as shown below:

In the Claims:

Column 7:
Line 25, Claim 19, insert --a-- after "exceeding"; and

Column 8:
Line 19, Claim 20, insert --a-- after "exceeding".

Signed and Sealed this
Fourteenth Day of May, 2013

Teresa Stanek Rea
*Acting Director of the United States Patent and Trademark Office*